(12) United States Patent
Ambs et al.

(10) Patent No.: US 6,474,254 B1
(45) Date of Patent: Nov. 5, 2002

(54) SUBMARINE DEPLOYED OCEAN BOTTOM SEISMIC SYSTEM

(75) Inventors: Loran D. Ambs, Houston, TX (US); Duncan Riley, Houston, TX (US)

(73) Assignee: WesternGeco LLC, Houston, TX (US)

( * ) Notice: Subject to any disclaimer, the term of this patent is extended or adjusted under 35 U.S.C. 154(b) by 0 days.

(21) Appl. No.: 09/537,841

(22) Filed: Mar. 29, 2000

Related U.S. Application Data

(63) Continuation-in-part of application No. 09/304,506, filed on May 3, 1999, now Pat. No. 6,285,956, which is a continuation-in-part of application No. 09/000,769, filed on Dec. 30, 1997, now Pat. No. 6,028,817.

(51) Int. Cl.[7] ............................................. H02G 1/10
(52) U.S. Cl. ....................... 114/312; 405/167; 405/172; 405/184.4
(58) Field of Search ................................. 114/312, 313; 367/15, 16, 19; 405/166, 167, 172, 184.4

(56) References Cited

U.S. PATENT DOCUMENTS

| | | | |
|---|---|---|---|
| 4,010,619 A | * | 3/1977 | Hightower et al. ......... 114/322 |
| 4,870,625 A | | 9/1989 | Young et al. ................. 367/16 |
| 5,442,590 A | * | 8/1995 | Svenning et al. ........... 181/112 |
| 5,747,754 A | | 5/1998 | Svenning et al. ........... 181/401 |
| 5,995,882 A | * | 11/1999 | Patterson et al. ........... 114/312 |

OTHER PUBLICATIONS

"Technologies Converge to Lay Arctic Cable"; GPX World, Jan. 1999, pp. 23–26, 28, 30, 32–33.

* cited by examiner

Primary Examiner—Sherman Basinger
(74) Attorney, Agent, or Firm—Madan, Mossman & Sriram, P.C.

(57) ABSTRACT

A method and vehicle to deploy and retrieve seismic apparatus to and from the ocean bottom and to acquire data from the seismic apparatus. Submersible robotic vessels deploy and retrieve the seismic apparatus to the ocean bottom to depths of up to 5,000 meters. The vessel can separate from the seismic apparatus and return to resume seismic operations. A robotic arm manipulates the seismic apparatus and attaches them to the ocean bottom utilizing fasteners to actively couple the seismic apparatus to the ocean bottom.

18 Claims, 2 Drawing Sheets

SUBMARINE DEPLOYED OCEAN BOTTOM SEISMIC SYSTEM

CROSS REFERENCE TO RELATED APPLICATIONS

This application is a continuation in part of and claims priority from U.S. patent application Ser. No. 09/304,506 filed May 3, 1999, now U.S. Pat. No. 6,285,956, which is a continuation in part of and claims priority from U.S. patent application Ser. No. 09/000,769, now U.S. Pat. No. 6,028,817 entitled "Marine Seismic System with Independently Powered Tow Vehicle" which was filed on Dec. 30, 1997 and issued on Feb. 22, 2000.

FIELD OF THE INVENTION

The present invention relates generally to the field of marine seismic surveys and particularly to the field of deployment and retrieval of seismic sensors on the ocean bottom by autonomous underwater vehicles.

BACKGROUND OF THE INVENTION

It is known that aggregates of solid minerals, e.g., manganese nodules, have been found on many areas of the deep ocean bottoms and other undersea floors. Underwater photography and television, and ocean bottom sampling techniques such as mechanical or suction dredging, have shown that manganese nodules are scattered in various concentrations at many different places on the deep sea floors. Moreover, spots where at least some manganese nodules have been found have been charted on maps of the ocean floors. Proposals have been made to mine the ocean floor to obtain commercially worthwhile amounts of minerals such as manganese nodules. In order to most efficiently apply undersea mining methods and equipment, it is important to identify and delineate undersea floor areas having a relatively large proportion of the floor, e.g., 25 or 50% or more of the floor area, covered with desired minerals such as manganese nodules.

U.S. Pat. No. 4,075,599 discloses a process and apparatus for underwater geophysical exploration to prepare surveys of undersea floor areas having solid minerals, such as manganese nodules, dispersed at sea floor surfaces transmits and perceives special acoustic vibrations providing information useful for identifying and delineating sea floor areas where desirably large amounts of solid minerals are present.

In the seismic surveying of submerged geophysical formations for gas and petroleum deposits, it is often desirable to gather wide angle reflection and refraction data which typically constitutes the bulk of the information obtained. Gathering seismic data for oil and gas exploration requires a greater separation of seismic wave sources and detectors than can be achieved with the co-located acoustic wave sources and sensors commonly used to gather monostatic reflection surveys for mineral resources.

U.S. Pat. No. 4,387,450 discloses a marine seismic data acquisition system whereby data is gathered by a single vessel beyond the range of a conventional towed seismic sensor cable through the use of expendable sensors and hard-wire transmission cables. The surface vessel tows a submerged platform adapted to carry several inexpensive seismic sensors and very small diameter multiconductor cables which are controllably released from the platform by appropriate equipment on the towing vessel. Signals generated by each sensor are transmitted back to the towed, submerged platform through the small diameter cable connected to each sensor and are transmitted by other means from the platform to the towing vessel for retransmission, recording and/or display. Each sensor transmits a signal back to the platform until its small diameter cable is completely deployed at which time the cable breaks and is abandoned together with the sensor. Very small diameter marine cables, which are commercially available in lengths of 20,000 feet and more are used to practice the invention, are coupled with an inexpensive hydrophone and preamplifier to allow the generation and reception of wide angle reflection and short range refraction seismic signals by a single vessel.

AUV's have been designed to spool out fiber optic cable under ice caps in the ocean, however, these AUVs and cables are not neutrally buoyant, and require complex dynamic buoyancy adjustment mechanisms to compensate and balance the buoyancy of the AUV as it deploys cable. Such an AUV is discussed by J. Ferguson et al, in *Theseus AUV—Two Record Breaking Missions*, Sea Technology, pp. 65–70, February 1999. Moreover, the prior AUV do not retrieve the cables for redeployment. As cable leaves the AUV, weight is lost. To prevent this from affecting trim and buoyancy, the loss in weight is counteracted by an automatic buoyancy compensation system. Surrounding each cable spool is a toroidal hard ballast tank that is filled with water as the cable is dispensed from its spool. This keeps the buoyancy of each spool assembly near neutral. Metallic tabs at the end of each cable spool signal the vehicle control computer as each pack is emptied. This buoyancy compensation system is complex and adds weight and required size to the AUV.

The typical systems, discussed above, do not retrieve the hydrophones and cables for redeployment and reuse. This practice of abandoning the deployed hydrophones and cables after one use is expensive. Such abandonment requires stocking of multiple sets of hydrophones and cables for seismic coverage requiring more than one deployment of a hydrophone and cable system. Moreover, these conventional systems do not monitor deployed hydrophones so that inoperable hydrophones may be unknowingly deployed. Thus, an inoperable hydrophone would not be discovered until after a seismic data acquisition run. In such a case, new hydrophones would have to be deployed to replace the inoperable hydrophone and the seismic data acquisition run repeated because of inoperable hydrophones having been unknowingly deployed or deploying operable hydrophones in an inoperable position. Conventional systems have relied on passive coupling of hydrophones to the ocean bottom. These conventional systems rely on the combined negative buoyancy of the cable and hydrophones to sink to the ocean bottom and lie thereon. The hydrophones and cable are passively coupled to the ocean bottom by virtue of having come to rest thereon. Such passive coupling can cause suboptimal data due to the hydrophones not being well coupled to the ocean bottom and thus receiving less signal information from the ocean bottom.

Some passive systems have added weight to the cable and hydrophones to increase negative buoyancy intending to improve passive coupling, however, the additional weight complicates deployment and retrieval. Heavier cables and hydrophones can also decrease passive coupling because the heavier weight cable are stiffer to handle. Stiffer cables are less flexible and thus less likely to conform to the ocean bottom and more likely to form kinks on the bottom. The stiffer cables can actually decrease passive coupling and may require repetition of a seismic data acquisition pass due to misplacement of hydrophones which do not actually contact the ocean floor. Such repetition of seismic data acquisition is extremely expensive.

Conventional seismic data collection at the ocean bottom is thus problematic, costly and cumbersome. Conventional seismic data collection techniques require special vessels to deploy and retrieve heavy cables and equipment. Moreover, such deployment techniques physically distress the cable as it is being deployed and retrieved. Thus there is a need for a simplified, cost effective solution with quality control monitoring of the hydrophones and cables as they are deployed. There is also a need for a method and apparatus for deployment and retrieval of ocean bottom cable sensors from an autonomous underwater vehicle. There is also a need of a neutrally buoyant AUV and cable with active coupling of cable to the ocean bottom.

The heavy weight of conventional systems has made operations in water more than a few hundred meters in depth extremely slow, expensive and very hard on equipment. There is a need for a system capable of operating in thousands of meters of water.

SUMMARY OF THE INVENTION

The present invention overcomes the problems of the prior art discussed above. The present invention provides an autonomous underwater vehicle (AUV) that deploys and retrieves an ocean bottom seismic system comprising cables and seismic sensors. The AUV can separate from the deployed seismic system and return later to resume recording of seismic data. The present invention also monitors the operational status of the hydrophones and sensors during deployment so that inoperable hydrophones/sensors may be replaced while AUV is in position at the inoperable hydrophone location and prior to the seismic data acquisition. The AUV and cable/sensors are neutrally buoyant to reduce the size of the vehicle and eliminate the need for an apparatus which adjusts the dynamic buoyancy of the AUV for changes in buoyancy caused by dispensing negative or positively buoyant cables and sensors. The present invention attaches the neutrally buoyant cable to the ocean floor by means of a fastener thereby actively coupling the sensors to the ocean floor. The preferred cable and sensor comprises a uniform diameter incorporating sensors having a diameter less than or equal to the diameter of the cable in which they are housed.

DETAILED DESCRIPTION OF A PREFERRED EMBODIMENT

Figure 1:
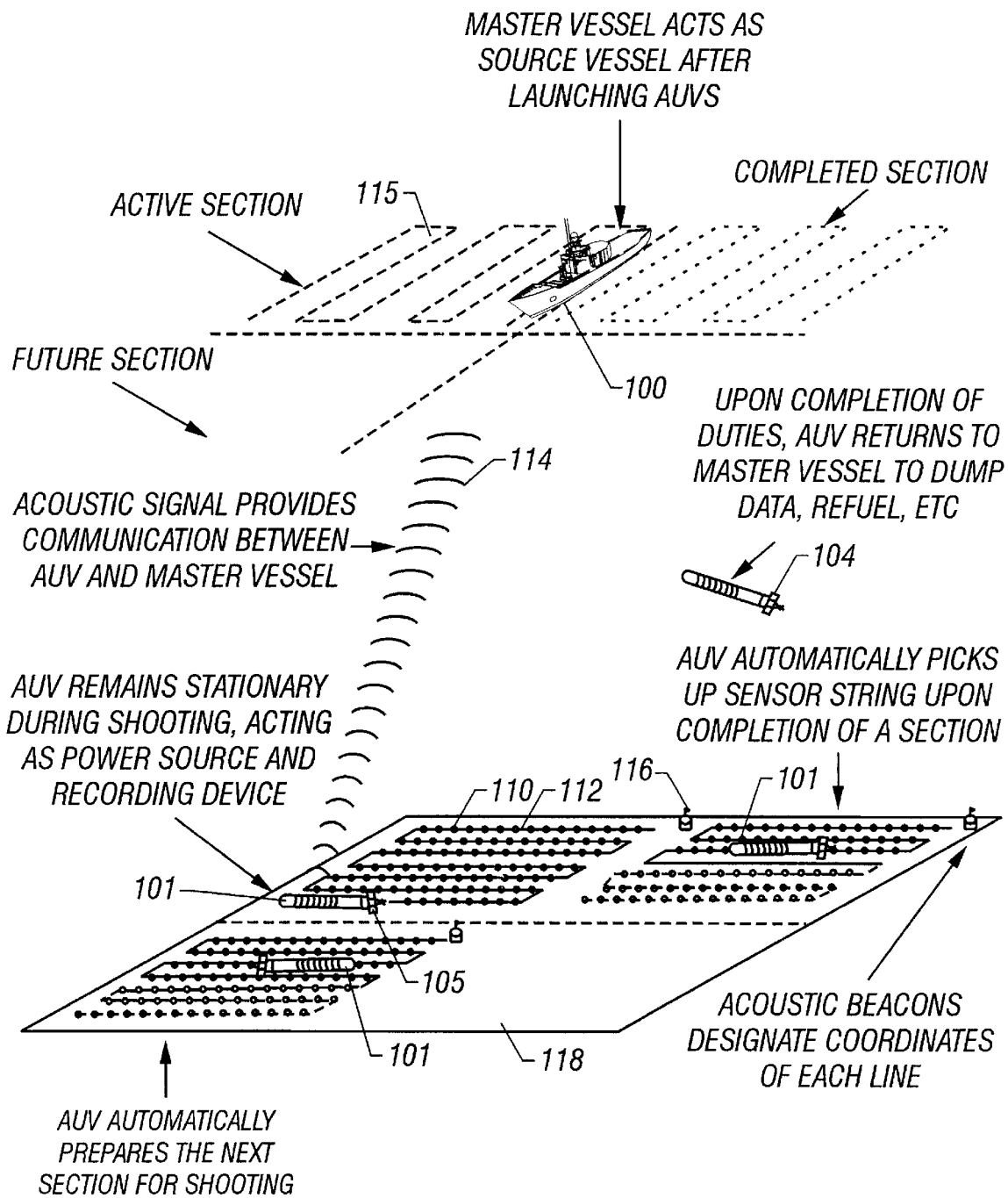
FIG. 1 comprises a schematic depiction of the apparatus and method for deploying, monitoring and retrieving an ocean bottom seismic system via autonomous underwater vehicles supported by a master vehicle.

Turning now to FIG. 1, in a preferred embodiment of the present invention, a master vessel 100 transports one or more autonomous underwater vehicles 101 (AUV's) to the survey area. The master vessel 100 may also serve as source vessel for generating acoustic signals for seismic data acquisition after launching at least one AUV. The one or more AUV's each carry approximately 10 km of spooled seismic sensors 110 and cable 112 sections to the subsurface which may be up to 5000 meters under the surface of the water. The AUV 101 deploys ocean bottom sensors 110 and cable 112 on (or in) the ocean bottom as designated by mapping coordinates defining an active sensor patch 115 referenced to acoustic beacons 116. The neutrally buoyant AUV 101 anchors itself to the bottom via anchors 136 at the end of the assembly of sensors 110 and cable 112. The AUV 101 provides power to, monitors the status of and controls the seismic sensors 110 and cables 112. The AUV 101 can separate from the deployed assembly of sensors 110 and cables 112 and return later to resume recording of seismic data. The ability to separate from the assembly and return to resume seismic recording enables comparison of seismic data taken at different times to infer changes in the reservoir, i.e., four dimensional seismic data.

Figure 2:
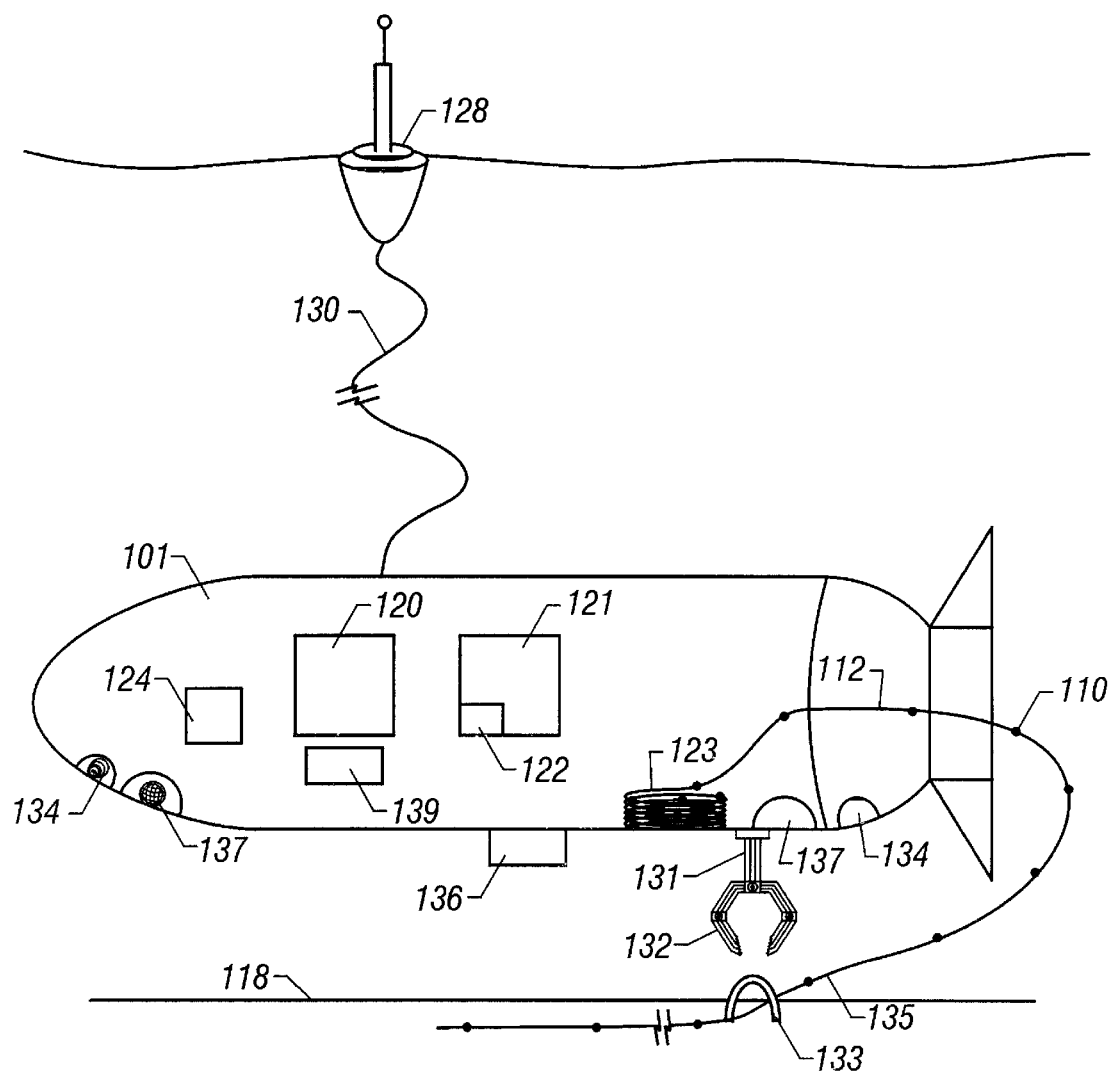
FIG. 2 is a schematic diagram of the AUV of the present invention laying cable on the ocean bottom.

Turning now to FIG. 2, as the seismic sensors 110 and cable sections 112 are deployed from the AUV, the controller senses when a sensor exits the AUV and performs a diagnostic to verify that the sensor is fully operational. AUV robot arm 131 replaces bad sensors when the diagnostic indicates that the sensor is not operational. Diagnostic are also forwarded as a QC report to the master vessel via acoustic link 114. The diagnostic maybe performed before or after the sensor exits the AUV. After deployment of an operational sensor, robot arm 131 and robot hand 132 affix fastener 133 to assembly 135 comprising sensors 110 and cable 112 to anchor assembly 135, to the ocean bottom 118. The master vessel reviews sensor diagnostics as necessary.

The AUV 101 houses the recording system 120 for seismic data sensed by deployed sensors 110. The AUV 101 and master vessel 100 coordinate seismic source shot times by synchronized high accuracy clocks. The AUV clock 122, and the master vessel 100 clock are typically a cesium beam clock or similar stable clock. The events are synchronized via time tagged messages sent over an acoustic link, e.g. "next shot will occur at 14:24:30". Commercial-off-the-shelf cesium beam clocks which are well known in the industry are used to provide event and data acquisition timing accuracy within $5 \times 10^{-14}$ seconds over 30 days. The cesium clock on the master vessel 100 is similar to and synchronized with the cesium clock 122 on the AUV, however, the master vessel clock is not shown in the drawings. Once the seismic sensors are deployed and the recording system initialized, the source boat 100 traverses a path to insonify the subsurface in such a way to produce reflection points from subsurface formations at desirable locations with respect to the location of source and receivers.

The AUV on-board processing and control system 121 evaluates each channel of data captured and generates a quality control ("QC") summary report for review at the master vessel. The controller scans data from the sensor to check for clipping, dead channels, low amplitude channels, etc. and sends the report to the master vessel 100. The QC report is communicated to master vessel 100 by acoustic data link 114 at 10 Kbps. This is an improvement over the prior systems that sent data upstream to a master vessel for analysis after the run, which may require re-shooting a seismic area due to bad sensors discovered after the seismic data acquisition run.

To move the deployed cables 110 and sensors 112 from one location to another after a seismic data acquisition run, the AUV 101 retrieves the deployed sensors 110 and cables 112. In retrieval the AUV removes fastener 133 using robot arm 131 and robot hand 132, and returns to the surface to transfer digital data, if desired, to be refueled or for maintenance. The AUV does not require physical recovery on-board the master vessel. The AUV then navigates to the next receiver patch spread location and begins the deployment and data acquisition cycle again. A power supply 124 comprising well known existing fuel cell technology provides power (750 kWh) for two to three weeks of AUV 101 locomotion and power for on-board electronics 120, 121 and 122.

In an alternative embodiment, the AUV 101 is used in connection with a surface buoy 128 connected by a fiber connection 130 for radio communication with the master vessel 100. Data transferred via the fiber 130 (or other telemetry path such as an electrical fiber) comprises AUV video data during deployment and retrieval; seismic data generated during data acquisition in real-time; seismic data for storage at the buoy; status and health of recording and AUV systems; AUV recording system parameters; and seismic source shot times from the master vessel 100 or an acoustic source boat.

The AUV 101 performs real-time diagnostics in processor and controller 121 as it deploys sensors. If a bad sensor is detected, an on-board robotic manipulator device comprising robot arm 131 and robot hand 132 may replace the bad sensor pack with a good one. The robotic manipulator arm 131 and hand 132 are aided by lights 137 and camera 134. Multiple AUV's may work to deploy a new receiver patch ahead of the active spread, referred to as "roll-along." Likewise, a receiver patch already surveyed may be recovered simultaneously with recording data from an active spread. The recording system storage media 120 may be physically recovered separate from the AUV.

The assembly 135 of cable 112 sections and sensors 110 and the AUV 101 are neutrally buoyant. The assembly 135 is anchored to the ocean bottom by AUV robot arm 131 using hand 132 to place fasteners 133 over the assembly 135 to anchor the assembly 135 of cable 112 sections and sensors 110 to the ocean bottom 118. After seismic data acquisition, the AUV 101 retrieves the assembly 135 using robot arm 131 to remove the fasteners 133 and store the assembly 135 of cable 112 and sensors 110 on storage reel 123 in AUV 101.

The AUV is powered by a fuel cell 139 or battery which is preferably a fuel cell such as a 750 kilowatt hour hydrogen peroxide fuel cell available commercially. In an alternative embodiment, the AUV can be launched from shore based facilities and transit autonomously to a survey site independently of source or control vessels.

The present invention has been described with a certain degree of specificity. Variations will occur to those skilled in the art which are within the scope of this invention. While the foregoing disclosure is directed to the preferred embodiments of the invention, various modifications will be apparent to those skilled in the art. It is intended that all variations within the scope and spirit of the appended claims be embraced by the foregoing disclosure.

What is claimed:

1. A autonomous underwater vehicle (AUV) comprising:

an assembly comprising a cable section and a sensor, the assembly separably stored in the AUV;

a storage reel in the AUV for deploying the assembly from the AUV to an ocean floor and for retrieving the assembly from the ocean floor;

a controller/processor for performing a diagnostic on the sensor before deployment of the assembly; and a robot arm for replacing inoperable sensors before manipulating the assembly for at least one of deployment and retrieval.

2. The AUV of claim 1, further comprising:

a fastener separate from the sensor for anchoring the sensors to an ocean bottom, wherein the robot arm manipulates the fastener to perform at least one of: anchor a sensor to the ocean bottom and remove the fastener from the sensor.

3. The AUV of claim 1, wherein the assembly is substantially neutrally buoyant.

4. The AUV of claim 1 wherein the fastener is substantially neutrally buoyant.

5. The AUV of claim 1 wherein the AUV is neutrally buoyant.

6. The AUV of claim 1, wherein the controller/processor sends diagnostic status to a master vessel for analysis wherein diagnostic status comprises vehicle, sensor or data quality status.

7. The AUV of claim 1, further comprising an anchor for selectively affixing the AUV to the ocean bottom.

8. A method for deploying an assembly of cable and seonsors on an ocean bottom using an autonomous underwater vehicle (AUV) comprising the steps of:

deploying a first assembly comprising a cable section and sensor separable stored in the AUV;

retrieving the assembly from the ocean floor;

performing a diagnostic to determine if the sensor is inoperable before deploying the sensor; and operating a robot arm for placing the sensor before deployment if the sensor is inoperable.

9. The method of claim 8, further comprising:

selectively anchoring the sensor to an ocean bottom, wherein the robot arm manipulates the fastener to anchor the deployed sensor to the ocean bottom during deployment and removes the fastener during retrieval of the assembly.

10. The method of claim 8 further comprising the step of:

separating the AUV from the deployed first assembly.

11. The method of claim 10 further comprising the step of:

returning the AUV to the deployed first assembly; and recording four-dimensional seismic data.

12. The method of claim 8 further comprising:

performing a diagnostics on at least one of: sensors, vehicle and acquired data.

13. The method of claim 8, further comprising:

sending diagnostic status to a master vessel for analysis via at least one of: an acoustic data link, optical fiber or electrical fiber.

14. The method of claim 8, further comprising:

selectively affixing the AUV to the ocean bottom.

15. The AUV of claim 1 further comprising:

a separable recording system for recording seismic data.

16. The AUV of claim 1, further comprising:

a quality control report sent to a master vessel.

17. The method of claim 8, further comprising:

a time-tagged message for synchronizing events between the AUV and a master vessel.

18. The method of claim 8 further comprising:

retrieving a second assembly while recording seismic data from the first assembly.

* * * * *